May 7, 1963

M. F. PETERS 3,088,487

HIGH PRESSURE VALVE ASSEMBLY

Filed Sept. 26, 1958

INVENTOR.
MELVILLE F. PETERS
BY Albert F. Kronman

ATTORNEY

May 7, 1963

M. F. PETERS 3,088,487

HIGH PRESSURE VALVE ASSEMBLY

Filed Sept. 26, 1958

INVENTOR.
MELVILLE F. PETERS

BY Albert F. Kronman

ATTORNEY

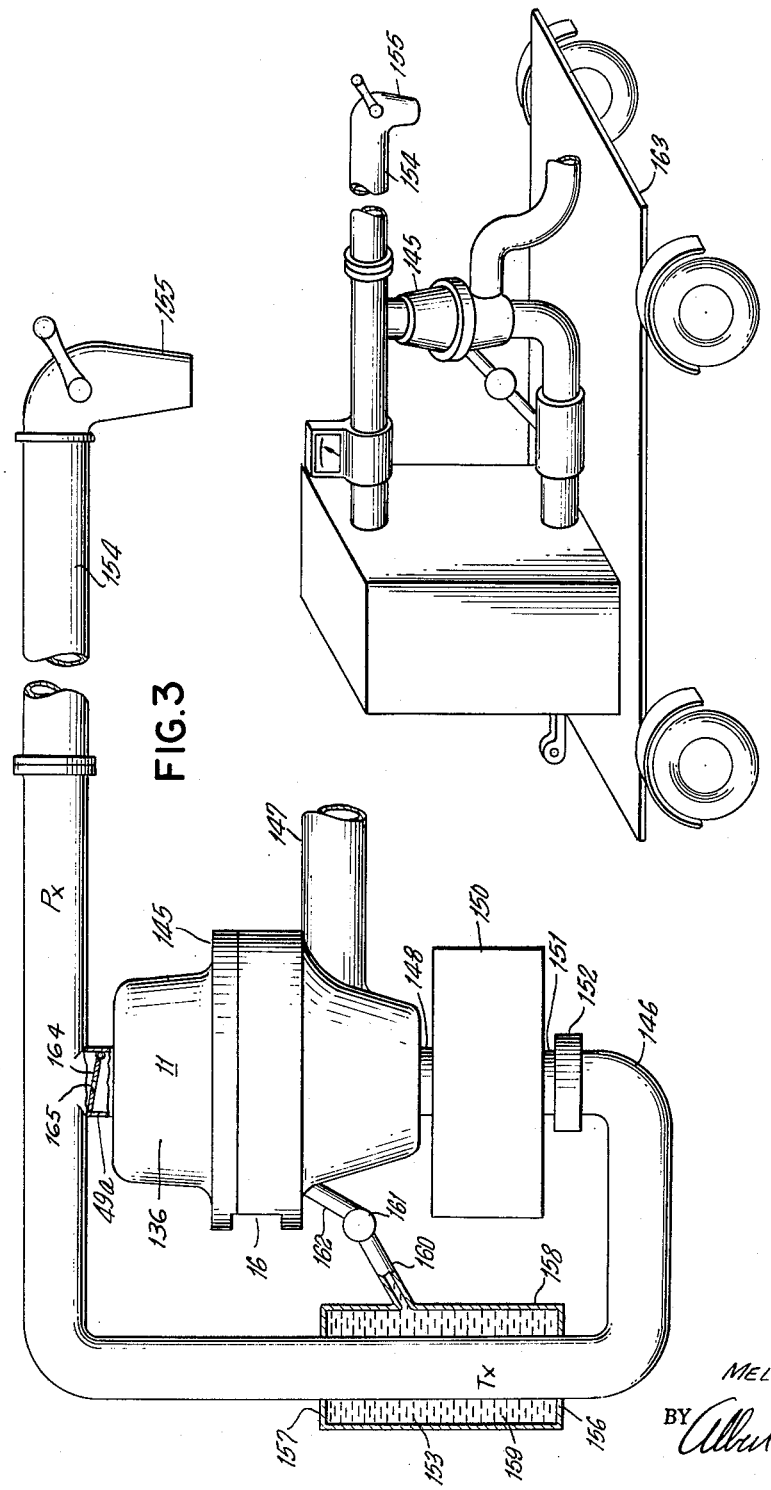
INVENTOR.
MELVILLE F. PETERS
BY Albert F. Kronman
ATTORNEY

Patent text

3,088,487
HIGH PRESSURE VALVE ASSEMBLY
Melville F. Peters, Livingston, N.J., assignor of fifty percent to Joseph J. Mascuch, Millburn, N.J.
Filed Sept. 26, 1958, Ser. No. 763,669
7 Claims. (Cl. 137—505.35)

This invention relates to valves and particularly to valves which are used to regulate the flow of high density fluids traveling at high velocity through lines having relatively large diameters.

When a mass of fluid is passing through a line and its travel is suddenly interrupted as by the closing of a valve, the kinetic energy of the said fluid must be dissipated in the system. Unless expansion or surge chambers are provided for dissipating this energy, the energy must be dissipated by compressing the fluid and expanding the conduit. When the fluid system is a high density liquid having a high rate of flow, a sudden stoppage of the liquid may produce such a rapid development of high pressure that the system will emit a loud noise. Where the liquid is water this noise is commonly known as water hammer. In the case of fuel lines, such as are used for refueling airplanes and the like, the pipe employed may be 6 or 8 inches in diameter. These pipes may transmit fuel at the rate of 600 gallons per minute for each unit and 3 or more units may be in operation at the same time. When two or more refueling units close their valves simultaneously, the surge pressures developed in the system may be 1000 p.s.i. or more, and these high pressures will act on the entrance side of the valve.

Presently known control valves used for regulating the rate of fluid flow employ a diaphragm to sense the pressure. Adjustment of the rate of flow is made by using springs to control the forces acting on the different components of the valves. However, the adjustment of the springs requires the services of a trained mechanic and these valve springs are often thrown out of adjustment when the valve is mounted on a fuel truck, and the fuel truck is drawn over a rough field.

Another form of presently known valves used for this purpose replaces the diaphragm and spring with a bellows which is pressurized to exert the same force on the valve stem as one or more of the springs in the conventional spring type valve. Such valves employing bellows are satisfactory when the maximum pressures developed in the system are relatively low. In these valves low pressure bellows can be used in both small and large valves. Since low pressure bellows can be made to elongate 30% or more of their free lengths, a relatively short low pressure bellows can accommodate the large stem displacements required in the larger valves.

However, when the operating pressures are high it is necessary to reduce the difference between the outside and the inside diameter of the bellows plates and to increase their thickness. These changes in the plate dimensions reduce the flexibility of the bellows and at extremely high pressures the safe elongation of the bellows may be only a few percent of its free length. Where the valve requires opening of several inches, the high pressure bellows may require such a great overall length that the valve assembly becomes impractical.

Accordingly, it is an object of the present invention to provide a valve for the control of fluids under high pressure employing bellows of relatively small overall length.

Another object of the present invention is to use both high and low pressure bellows assemblies in combination within a valve.

Still another object of the present invention is to provide a bellows type control valve of great sensitivity.

A further object of the present invention is to provide a valve construction in which the change of pressure in the pressurized chamber of the valve with valve stem displacement is negligible.

An object of the present invention is to provide a structure by means of which the control pressure pattern of the valve may be controlled.

A further object of the present invention is to provide a valve assembly in which the rate of closure can be limited or regulated without decreasing the sensitivity of the valve.

An object of the present invention is to introduce into a bellows type control valve damping elements which will limit the amplitude of the vibrating part of the valve.

Still another object of the present invention is to provide a unit which is responsive to disturbances in the system and to apply the disturbances to a pressure pattern which can be applied to the control unit of the valve.

A feature of the present invention is its combination of low pressure bellows with high pressure bellows whereby the two bellows acting together can accommodate large movements during the period that the pressure differentials across the bellows assembly are small and relatively small movements during the period when the pressures are high.

Another feature of the present invention is its use of nesting type low pressure bellows to prevent bellows destruction during conditions of high pressure.

Still another feature of the present invention is its use of high pressure bellows in a partially extended position at the instant that the low pressure bellows is collapsed in the operation of the valve.

A further feature of the present invention is its use of the low pressure bellows to achieve the major portion of the valve stem movement and the use of the high pressure bellows to take care of the remainder of the valve stem movements under the conditions of high pressure.

Still another feature of the present invention is its use of a large tank connected to the pressurized chamber within the bellows in order that the overall change in volume of the system be negligible when the volume of the chamber in the valve is changed by the movement of the valve stem.

Still another feature of the present invention is its use of an auxiliary tank connected to the pressurized chamber of the valve which tank is large in volume compared to the volume of the valve chamber whereby the pressure pattern of the valve may be controlled by controlling the temperature of the auxiliary tank.

A feature of the present invention is its use of bellows with large combined effective areas which will respond quickly to small changes in pressure.

A still further feature of the present invention is its use of one or more orifices in the valve assembly to limit the ratio of closure of the valve without increasing its sensitivity.

A feature of the present invention is its use of check valves as damping elements within the valve assembly to limit the amplitude of the vibrating parts when the valve is subjected to shaking forces.

Another feature of the invention is its use of a bellows assembly consisting of bellows having different piston or effective areas, where said bellows in the assembly may have the same spring rates or different spring rates, or one of the bellows may be of the nesting type.

A feature of the present invention is its use of valve discs having an area greater than the piston areas of the bellows employed within the valve.

Still another feature of the present invention is its use of a second bellows serving as a piston to which control information can be relayed.

A further feature of the present invention is its use of fluids and gases, separately or in combination with the pressurized chamber of the valve to compensate for changes in viscosity of the fluids passing through the valve.

The invention consists of the construction, combination and arrangement of parts, as herein illustrated, described and claimed.

In the accompanying drawings, forming a part hereof are illustrated six embodiments of the invention and in which:

FIGURE 3 is a view in side elevation partly broken away, of a sixth embodiment of the present invention, particularly adapted to rapid valve closures without using surge chambers.

FIGURE 4 is a view in side elevation showing the application of the valve shown in FIGURE 3 to a refueling cart.

Figure 1:
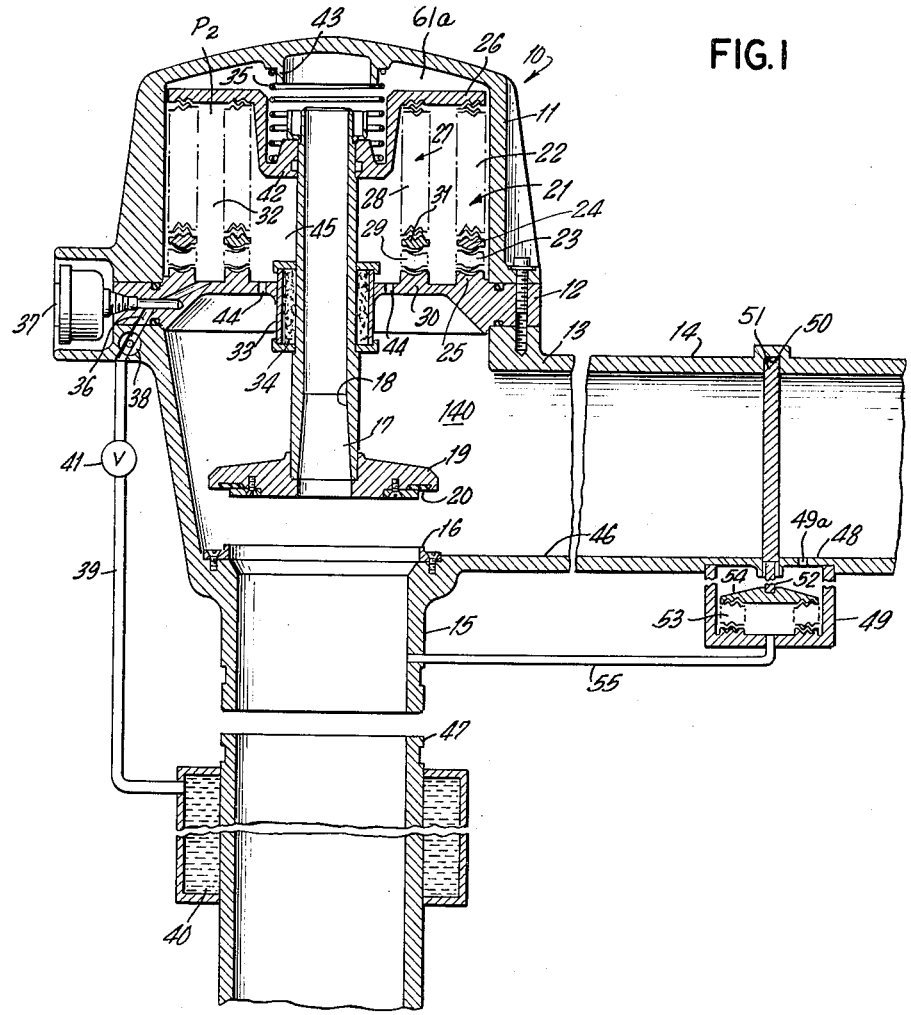
FIGURE 1 is a view in vertical section showing one complete embodiment of a high pressure fluid valve in accordance with the present invention.

Referring to the drawings and particularly to FIGURE 1, 10 indicates a three piece housing consisting of a dome shaped member 11, a separator or inner wall 12 and a lower conduit assembly 13. The conduit assembly 13 is provided with inlet and outlet portions 14, 15. A valve seat 16 is carried within the lower conduit around the outlet portion 15 thereof. A valve stem 17 is disposed above the valve seat 16 and is slidably received within the separator or inner wall 12. The valve stem 17 is centrally bored as indicated at 18 for a hereinafter described purpose. The valve stem 17 carries a valve disc 19 immediately above the valve seat 16. The valve disc 19 may be provided with a sealing element 20 which mates with the valve seat 16 to form a seal when the valve is closed.

A first bellows assembly 21 consisting of a low pressure bellows 22 and a high pressure bellows 23 is carried within the dome shaped member 11. The bellows 22, 23, are preferably made of washer shaped discs of metal, alternately welded together at their inner and outer edges to form a continuous bellows member. The high pressure bellows 23 is secured at its lower end to the separator 12 and at its upper end to a ring 24. A bellows support 25 is provided on the separator 12 to receive the bottom disc of the high pressure bellows 23. The bellows support 25 is shaped to conform to the surface of the bellows 23 adjacent the said support 25. The lower surface of the ring 24 is also machined to conform to the shape of the bellows 23 which is received thereon. The lowermost disc of the low pressure bellows 22 is attached to the upper surface of the ring 24. The topmost disc of the bellows 22 is secured to an end flange 26 which end flange is formed to the configuration of the top disc of the low pressure bellows 22. Since all the discs in the low pressure bellows are of identical shape in each of the bellows and since their supports conform thereto, when the bellows are tightly compressed to their minimum length, the discs nest upon one another, and when completely nested, form a semi-rigid column of plates capable of withstanding pressures far in excess of that of the bellows when expanded.

A second bellows assembly 27 is positioned within the first bellows assembly 21 and consists of a low pressure assembly 28 and a high pressure bellows 29. The bottom ring of the high pressure bellows 29 is carried upon a bellows support 30 formed in the separator 12. The upper end of the high pressure bellows 29 is secured to a ring 31. The lower end of the low pressure bellows 28 is secured to the top of the ring 31 and the upper end of the bellows 28 is attached to the end flange 26. All of the surfaces of the end flange, the ring and the bellows support 30, are machined to conform to the bellows element adjacent thereto in accordance with the previously described construction mentioned in connection with bellows 21 and 22. A sealed chamber 32 is thus formed between the two sets of bellows 22, 23, and 28, 29.

A valve stem receiving sleeve 33 is carried by the separator 12 and may be filled with some suitable packing material 34. A coil spring 35 is disposed between the disc side of the dome shaped member 11 and the end flange 26. The spring 35 urges the end flange downwardly so that in the event of bellows failure and loss of pressure within the dome the end flange would move in the direction of the valve seat 16 carrying with it the valve stem 17 and valve disc 19. In this manner the valve will "fail safe." The separator plate 12 and the lower conduit assembly 13 are bored as indicated at 36 to form a conduit leading from the chamber 32 between the bellows assemblies to the outside of the valve. The conduit 36 may be provided with a gage 37 and also with a sealing valve 38. A fluid bearing line 39 connects the conduit 36 with a tank 40. The line 39 is provided with a two-way valve 41. By connecting the tank 40 with the chamber 32 the tank 40 can be used to increase the overall volume of the pressurized chamber 32.

The low pressure bellows 22, 28, have a much lower spring rate than that of the high pressure bellows 23, 29. Accordingly, the low pressure bellows 22, 28, will be completely nested so as to form a semi-rigid column consisting of the bellows plates, the rings, 24, 31, and the end flange 26 without permitting the high pressure bellows to be completely compressed. The low pressure bellows are therefore designed to be completely nested before the pressure within the dome 11 reaches the point at which they would fail. Additional motion to the valve stem 17 is thereafter provided through the medium of the high pressure bellows 23, 29, which are still extended and which will withstand the elevated pressure.

The end flange 26 which serves as a cap for the low pressure bellows 22, 28, is secured to the valve stem 17 by means of a fitting 42 which has a deep annular groove to receive the lower end of the coil spring 35. The upper end of the coil spring 35 is supported and guided by a ring shaped member 43 which is welded to the inside of the dome 11.

It is important to permit the valve to shut without slamming when extremely heavy pressures are developed in the fluid line. In order to accomplish this result the valve is provided with damping elements consisting of the sleeve 33 and the packing 34 around the valve stem 17. In addition, holes 44 are bored through the separator 12 to control the rate at which the liquid in the inner compartment 45 formed within the bellows assembly 28, 29, can return to the valve chamber 140.

The conduit 36 and the valve 38 form a passageway for admitting gas or fluid to the chamber 32 between the two bellows assemblies. The two way valve 41 in the fluid bearing line 39 can be turned to seal the chamber 32 after it has been pressurized to a desired pressure, or it may be turned to form a fluid connection between the tank 40 and the chamber 32 so that the volume of the pressurized assembly will consist of the chamber 32 within the valve and the tank 40. The volume of the chamber 32 will be greatest when the valve 41 is open and smallest when the valve 41 is closed.

The pressure $P_2$ in chamber 32 acting on the bellows assembly together with the spring action of the bellows 22, 23, 28 and 29 will determine the pressure $P_x$ in the system which will be required to close the valve by acting through opening 18 in valve stem 17 upon the top of end flange 26.

With the hereinabove described structure four closing patterns are possible, all of which are dependent upon the pressure change from the initial pressure $P_1$ within the chamber 32 to $P_2$. The closing patterns are as follows:

(1) "Using tank 40 in combination with the valve chamber 32. By making the tank 40 large compared with the chamber 32, the change of pressure of $P_1$ during the closing of the valve will be very small, and can be made to approach zero as the volume of chamber 32 is increased without limit."

(2) Sealing chamber 32 at valve 41 with the valve stem 17 raised to the open position at a pressure $P_1$.

The decrease in volume of chamber 32 when the valve closes will be relatively great so that the final pressure $P_2$ will be great.

(3) Sealing chamber 32 at valves 41 with the valve stem 17 raised to the open position at a pressure $P_1$ after partially filling chamber 32 with oil or some other suitable fluid.

This pattern will reduce the volume of air of the chamber 32 to some volume which will decrease as the quantity of oil put into chamber 32 is increased. If oil is put into the chamber 32 until the chamber is almost filled the ratio between the initial volume of air and the final volume of air can be made so large that the pressure $P_2$ will be great enough to hold the valve partly open when the surge pressure approaches several thousand pounds.

(4) The pressure $P_2$ is controlled by a computer system.

The pressure pattern may be controlled by a cam (see FIG. 4) which is cut so as to control the valve opening according to a number of operating conditions, some of which depend upon time, temperature, and the absolute pressure of the system in the manner hereinafter more fully described.

This sensitivity which is the movement or displacement of the valve stem with unit change in the operating pressure $P_x$ will be proportional to the effective or piston area of the bellows assembly and inversely proportional to the algebraic sum of the forces exerted by the spring 35, and bellows 22, 23, 28 and 29, on the valve stem.

Regardless of the dimensions of the component parts of the valve, the maximum sensitivity of the unit will be obtained when the internal pressure $P_1$ in chamber 32 is equal to the normal operating pressure $P_x$ in the system (assuming no spring forces) and the volume of the pressurized system includes the volume of the valve chamber 32 plus the volume of the tank 40. When this volume is so great that unit displacement of the valve stem 17 produces no appreciable change in the pressure $P_1$ in chamber 32 a unit change in pressure $P_x$ will produce a unit change in the pressure differential across the bellows assembly 22, 23, 28, 29.

Since there is no change in pressure in the pressurized chambers with valve stem movement, all pressure changes in the system will be used to control the length of the bellows and by making the algebraic sum of the spring forces small, the sensitivity can be made very great. Under these conditions the difference between the pressure required to open the valve and the pressure required to close the valve will be very small.

On the other hand when the volume of chamber 32 is made very small by partly filling the pressurized chamber with oil, so that volume $\bar{v}_1$ is reduced to volume $\bar{v}_1 0$, a small change in valve stem displacement will produce a large change in the pressure of the pressurized chamber 32, and consequently a large change in the operating pressure may be required to produce a small displacement of the valve stem. Under these conditions the sensitivity of the valve is low and the difference between the pressure required to open the valve and the pressure required to close the valve will be very great.

Since the position of the valve stem 17 depends upon the piston area of the bellows assembly, the algebraic sum of the spring forces, and the pressure differential across the bellows, the position of the valve stem 17 in any valve will be equal to the pressure differential multiplied by a constant, where the constant depends upon the physical properties and size of the component parts of the valve. When the pressure differential is positive and exceeds some value the valve will be fully opened and when the pressure differential is negative and exceeds some value the valve will be closed, where a positive differential means $P_1 - P_x$ and a negative differential means $P_x - P_1$. When the pressure differential $(P_1 - P_x)$ changes very rapidly, the valve may start to "hunt" or oscillate and if the fluctuation in pressure differential takes place with a frequency that approaches the natural frequency of oscillation of the flexible portion of the valve assembly, the whole unit may oscillate with dangerous amplitudes. Under adverse conditions the shaking forces excited by the liquid may be very great and for this reason a double damping assembly consisting of the sleeve 33 and packing 34 and the holes 44 in the separator 12 are incorporated into the valve. The operation of the valve shown in FIGURE 1 is as follows: fluid at pressure $P_x$ passing through the conduits 46, 47, fills the chamber 140 and enters the actuating chamber 61a through the valve stem bore 18. The pressure $P_x$ acting on the top of the flange 26 forces the valve toward its closed position compressing the fluid within the chamber 32 between the bellows assemblies. The fluid in chamber 32 acting to open the valve is thus changed from its initial pressure of $P_1$ to some higher pressure indicated as $P_2$. As long as the pressure in the conduits 46, 47, and the actuating chamber 61a exceeds the pressure within the chamber 32 the valve will continue to close or remain closed. As soon as the pressure $P_x$ drops below the pressure in the chamber the valve will open. It will thus be seen that the valve in FIGURE 1 will operate as a safety valve to protect equipment or valves on the exit side of the valve from excessive pressures.

When the pressure in the valve entrance conduit 46 drops below the pressure in the outlet conduit 47 and the pressure in conduit 47 is below the closing pressure of the valve, it is possible for the fluid in 47 to drain back into the system through conduit 46. This can be prevented by incorporating a valve 48 into the system. The valve 48 consists of housing 49, a valve disc 50 with a seat 51 in conduit 46, a valve stem 52 is connected at one end to the disc 50. A nesting type bellows 53 within the housing 49 has one end attached to a cap 54. The cap 54 supports stem 52. The opposite end of the bellows 53 is secured at its other end to housing 49. A conduit 55 is led from the inside of bellows 53 to the outlet conduit 47. As long as the pressure in conduit 46 is greater than the pressure in conduit 47, bellows 53 will be compressed by fluid entering the housing 49 through openings 49a, the valve 48 will be open and allow fluid to flow through the conduit 46. When the pressure in conduit 47 is greater than the pressure in conduit 46, the bellows 53 will expand and close the valve 48. This assembly is a substitute for a check valve.

It is within the scope of the invention to interchange the position of the high and low pressure bellows, so that bellows 23 is above bellows 22 and bellows 29 is above bellows 28.

Figure 2:
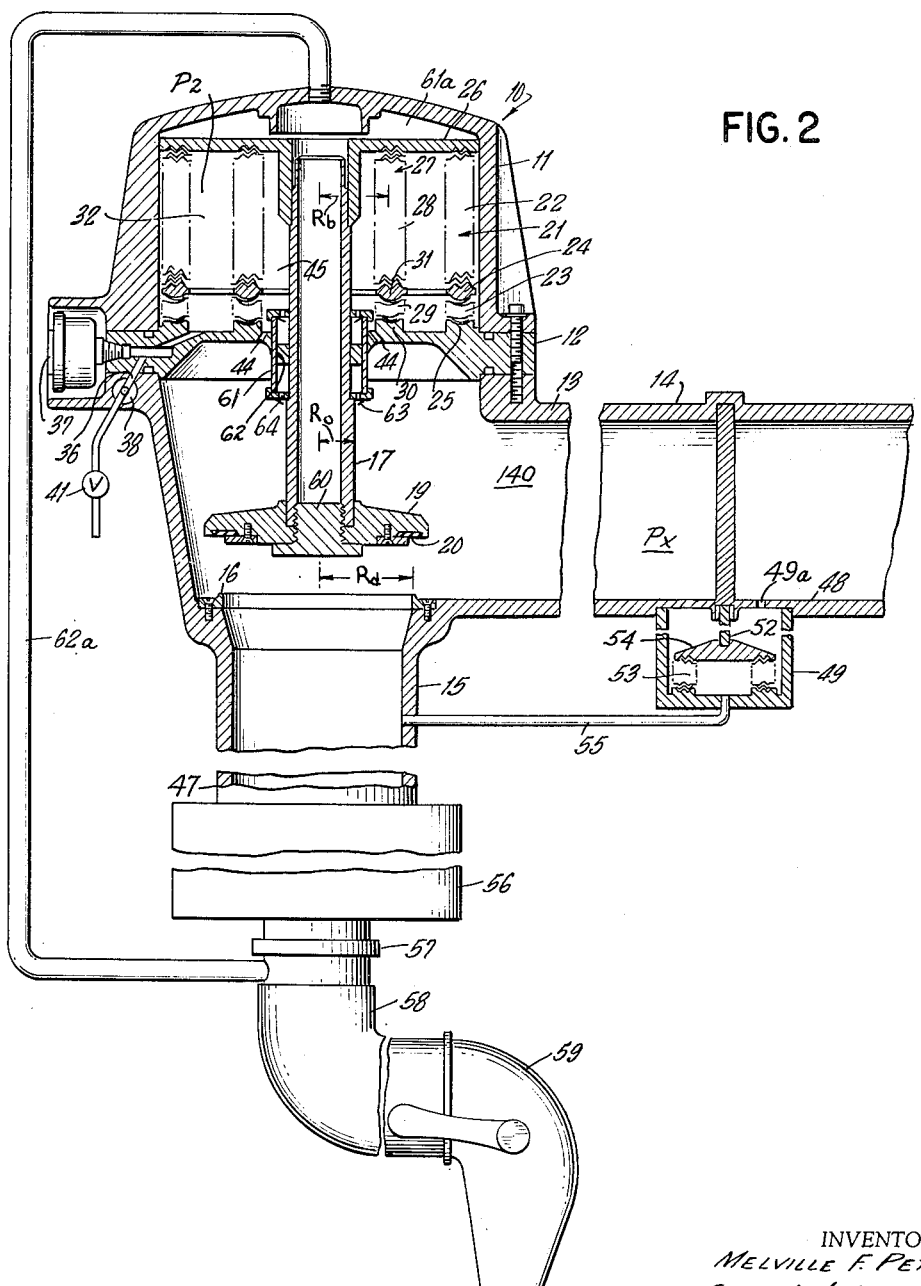
FIGURE 2 is a view in vertical section showing a second embodiment of a valve made in accordance with the present invention.

Referring to FIGURE 2, there is shown a modification of the valve described in conjunction with FIG. 1 as applied to a refueling cart for airplanes and the like. The modified valve consists of a regulating valve having the three piece housing 10, a filter 56 incorporated within the outlet conduit 47, a meter 57, a flexible conduit 58 attached to the outlet conduit 47 and a cutoff nozzle 59.

The regulating valve of FIG. 1 is responsive to the fluid pressures developed at the mouth of the cylindrical opening 18 in the valve stem 17. The regulating valve shown in FIG. 2 has been made to respond to the pressure developed in the flexible hose 58, by inserting a plug 60 into the mouth of the cylindrical opening 18 in the valve stem 17, and by transmitting the pressure developed in the flexible hose 58 to the actuating chamber 61a by means of a fluid conducting line 62a. This change in the position of the fluid inlet from the mouth of the valve stem 17 to the inlet of the flexible hose 58 is made to maintain a constant pressure at the nozzle 59 regardless of the pressure drop through the filter 56, which drop is small when the filter is clean and may be large when the filter is dirty.

The damping elements described in FIGURE 1 have been modified in the embodiment of FIGURE 2, so that the valve will close so quickly at the critical pressure that surge chambers which are now used with conventional valves can be eliminated without subjecting the filter 56, meter 57, and their associated elements, to the high surge pressures which are developed in the elements between valves 10 and 59 with an instantaneous closure of these two valves, and at the same time provide sufficient damping to prevent the valve stem 17 from vibrating when subjected to shaking forces. These modifications consist of enlarging the holes 44 in the separator 12 and replacing the sleeve 33 and packing 34, shown in FIG. 1, with a cylinder 61 welded to the separator 12. A piston 62 is welded to the valve stem 17 and check valves 63 in combination with holes 64 are used on the cylinder 61.

The combination of holes 64 and check valves 63 allow fluids to pass freely in and out of the holes 64 on the downward stroke of the valve stem 17 but retard or dampen the movement of the stem 17 on the upward stroke.

When the valve is closed, the forces due to the pressure in the valve chamber 140 acting down on the valve disc is equal to $\pi(R^2_d - R_0^2)P_x$ and the forces due to this same pressure acting on the upper end of the valve stem 17 after the fluid has passed through the holes 44 is $\pi(R_b^2 - R_0^2)P_x$. When $P_x$ is very high and the pressure in chambers 32 and 61a are relatively low when compared to $P_x$, it is possible for the high surge pressure to open the valve if $R_b$, were made great compared to $R_d$. For this reason $R_d$ must be made much greater than $R_b$. On the other hand, when $R_d$ is made very much greater than $R_b$, the valve will remain closed when the nozzle 59 is opened, providing the pressure $P_x$ is dangerously high and consequently this action can be considered an additional safety feature. This valve action can be eliminated when not wanted by keeping the difference between the two areas $\pi(R_d^2 - R_b^2)$ between 10 and 15% of the area of the bellows assembly, which is $\pi(R_b^2 - R_0^2)$.

In all other respects the operation of the valve shown in FIGURE 2 is identical to that shown in FIGURE 1 and identical parts have been given identical reference numbers. Assuming the nozzle 59 which has been dispensing fluid is suddenly closed, resulting in a surge of fluid pressure in valve inlet and outlet portions 14, 15. This pressure $P_x$ will be led to the actuating chamber 61a by the line 62a. If the pressure $P_x$ exceeds the pressure $P_1$ impressed upon the fluid in pressurized chamber 32 the valve will close. When the nozzle 59 is opened there will be a decrease in the pressure $P_x$ in the outlet portion 15 which will result in a decrease in pressure in the chamber 61a. The pressure in the chamber 32 which was increased from $P_1$ to $P_2$ by the closing of the valve will then force the valve open and fluid will pass through the valve.

When aircraft must be refueled over a temperature range of 175° F. or more, it is necessary to modify the refueling operating conditions to compensate for the changes in viscosity of the fuel due to changes in temperature if the refueling of the aircraft is to be carried out on schedule. Modification of the operating conditions when the regulator valve is controlled by a spring must be done manually, and in general, it is much simpler to make the corrections by changing the pressure at the pump than it is to change the opening of the valve by changing the tension on the spring.

When a pressurized chamber is substituted for the valve spring it is possible to increase the opening of the valve with an increase in temperature without changing the initial pressure $P_1$ in the pressurized chamber of the valve. This is done by selecting the size of the pressurized chamber so that a change in temperature of the fluids which actuates the valve stem will modify the valve opening so that a constant volume of liquid will pass through the valve for a predetermined pressure drop. This can be done over a wide temperature range by filling the pressurized chamber with a liquid when the change in viscosity with temperature is small, filling the pressurized chamber with gases when the change in viscosity with temperature is large, and filling the chamber with a combination of liquids and gases when the changes of viscosity with temperature are moderate. It follows that when the resistance to fluid flow is known throughout the whole system, that the size of the pressure chamber and the actuating fluids placed in this chamber can be selected so as to maintain completely, or at least partially, a constant rate of fluid flow at a constant pressure over the relatively wide range of viscosities which take place with these changes in temperature.

It should be pointed out that in handling many types of liquids an increase in pressure will not always result in a corresponding increase in the rate of fluid flow. For example, it was found that the viscosity of marine glue changes so rapidly with pressure, that doubling the pressure produced no appreciable increase in the velocity of extrusion through a small crack, and eugenol increased in viscosity by $10^7$ when it experienced a pressure change from 1 kg./cm.$^2$ to 12000 kg./cm.$^2$.

It is within the purview of the present invention to use fluids in the pressurized compartment of the valve, or the pressurized auxiliary equipment in combination with the valve compartment, so that the pressure drop across the valve or in the system will depend upon both the pressure and temperature of the liquids passing through the valve.

Since the viscosity of gases increases with an increase in temperature, the control system will have to increase the valve opening with an increase in temperature and decrease the opening with a decrease in temperature if the rate of fluid flow is to remain constant without a change in pressure drop through the valve.

Referring to FIGURE 3 there is shown a valve arrangement embodying principles hereinabove set forth which is useful when it is necessary to have an instantaneous closure of the valve. The instantaneous closure is obtained by bringing the conduit 146 which is located on the upstream side of the valve directly to the dome 11 of the said valve 145 so that pressure developed in the conduit 146 will be transmitted to the control chamber of the valve before it reaches the component parts of the refueling system. At the same time the conduit 146 brings the fuel to the chamber 153 which is used to correct for the changes in the viscosity of the fuel flowing through the assembly, adjacent the pressurized chamber within the valve. The conduit 146 which is 5 or 6 feet long, will assure a sufficiently rapid closure of the valve so as to make it unnecessary to use surge chambers in connection with this embodiment.

The assembly shown in FIGURE 3 consists of the valve 145 which is similar to the valve shown in FIGURE 2. Conduits 147 and 148 permit liquid to enter and leave the valve 145. A filter 150 is connected to the conduit 148 and a short length of conduit 151 leads from the filter 150 to a meter 152. The conduit 146 conducts fluid from the exit side of the meter 152 and passes through a chamber 153. The free end of the conduit 146 is connected to a dispensing conduit or flexible hose 154. The conduit 146 conducts the fuel at a pressure $P_x$ and a temperature $T_x$ to the hose 154 and the control nozzle 155. The chamber 153 is formed by two end plates 156, 157, which cap a cylindrical member 158. The chamber 153 contains a fluid 159 which can pass freely into and out of the pressurized chamber of the valve 145 through conduits 160, the valve 161 and the conduit 162. When the temperature $T_x$ of the fuel in the system drops, the temperature of the fluid 159 will drop and this will decrease the pressure in the pressurized chamber of the valve 145. When the temperature $T_x$ of the fuel in the system increases, the pressure of the fluid 159 in the chamber 153 will increase and these changes in pressure of the liquid 159 in the chamber 153 will control the changes in pressure in the pressurized chamber in the valve 145 so that when the temperature $T_x$ of the fluid passing through the system is high and the viscosity of the fuel is low the valve 145 for any given pressure $P_x$ will have a smaller opening between the valve disc and seat than when the temperature $T_x$ is low and the viscosity of the fuel passing through the system is relatively high.

In FIGURE 4 there is shown a specific embodiment employing the valve shown and described in connection with FIGURE 6. The illustration of FIGURE 4 is that of a refueling cart 163 on which the valve 145 and its assembly are mounted. The refueling cart may be drawn across the field to where it is needed and the hose nozzle 155 opened and closed abruptly without requiring surge chambers to absorb the pressure wave reflected from the hand valve 155.

When the pressure wave is reflected from the hand valve 155 the pressurized bellows assembly in the valve 145 is compressed in exactly the same way as the bellows assembly would be in a surge chamber were it placed in the system, and each one of the assemblies within the valve reduces the maximum pressure developed in the fluid upstream of the valve. A surge chamber used in connection with the refueling system would merely limit the peak pressure upstream of the valve. The bellows assembly herein described and shown within the valve not only will limit the peak pressure developed upstream of the valve but it will force the valve disc upon the valve seat so that the valve is closed and seals the downstream from upstream fluid.

A check valve 164 may be installed between the line 146 and the dome 136 where the reflected pressure waves from the upstream and downstream portions of the system do not add together. The check valve 164 will remain closed during the period the fluid is oscillating. A leakage port 165 is provided in the valve 164 in accordance with the usual check valve construction.

Having thus fully described the invention, what is claimed as new and desired to be secured by Letters Patent of the United States, is:

1. A pressure control valve for a fluid line comprising a valve housing, a wall having an opening therein in said housing dividing the housing into a valve chamber and an actuating chamber, bellows means consisting of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a valve stem within the housing coupled to the free end of the bellows means and extending through the wall opening into the valve chamber, a valve sealing member on the free end of the valve stem, an inlet and an outlet port in the valve chamber, a valve seat between the inlet and outlet ports in the valve chamber to receive the sealing member and control the flow through the valve ports, a quantity of a first fluid under pressure between the first and second bellows within the actuating chamber, means to direct the first fluid in the actuating chamber to hold the valve open, and means to apply a second fluid under pressure from the fluid in the fluid line to the actuating chamber to oppose the force exerted by the first fluid, whereby the pressure differential of the first and second fluids will govern the position of the sealing member with respect to the valve seat.

2. A pressure control valve for a fluid line comprising a valve housing, a wall having an opening therein in said housing dividing the housing into a valve chamber and an actuating chamber, bellows means consising of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a bellows receiving and conforming portion on the wall underlying the bellows means, a bellows conforming ring attached between each of the high and low pressure bellows, a valve stem within the housing coupled to the free end of the bellows means and extending through the wall opening into the valve chamber, a valve sealing member on the free end of the valve stem, an inlet and an outlet port in the valve chamber, a valve seat between the inlet and outlet ports in the valve chamber to receive the sealing member and control the flow through the valve ports, a quantity of a first fluid under pressure between the first and second bellows within the actuating chamber, means to direct the first fluid in the actuating chamber to hold the valve open, and means to apply a second fluid under pressure from the fluid in the fluid line to the actuating chamber to oppose the force exerted by the first fluid, whereby the pressure differential of the first and second fluids will govern the position of the sealing member with respect to the valve seat.

3. A pressure control valve according to claim 1 in which the free ends of the first and second bellows are secured to a flange freely carried within the actuating chamber and the fluid pressure from the fluid line is applied to said flange.

4. A pressure control valve for a fluid line comprising a valve housing, a wall having an opening therein in said housing dividing the housing into a valve chamber and an actuating chamber, bellows means consisting of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a valve stem within the housing coupled to the free end of the bellows means and extending through the wall opening into the valve chamber, a valve sealing member on the free end of the valve stem, a gland carried by the wall around the valve stem, fluid damping bores in the wall connecting the valve chamber with the interior of the first bellows, an inlet and an outlet port in the valve chamber, a valve seat between the inlet and outlet ports in the valve chamber to receive the sealing member and control the flow through the valve ports, a quantity of a first fluid under pressure between the first and second bellows within the actuaing chamber, means to direct the first fluid in the actuating chamber to hold the valve open, and means to apply a second fluid under pressure from the fluid in the fluid line to the actuating chamber to oppose the force exerted by the first fluid, whereby the pressure differential of the first and second fluids will govern the position of the sealing member with respect to the valve seat.

5. A pressure control valve for a fluid line comprising a valve housing, a wall having an opening therein in said housing dividing the housing into a valve chamber and an actuating chamber, bellows means consisting of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a valve stem within the housing coupled to the free end of the bellows means and extending through the wall opening into the valve chamber, a valve sealing member on the free end of the valve stem, an inlet and an outlet port in the valve chamber, a valve seat between the inlet and outlet ports in the valve chamber to receive the sealing member and control the flow through the valve ports, a quantity of a first fluid under pressure between the first and second bellows within the actuating chamber, means including a conduit in the valve housing leading from the space between the first and second bellows to the outside of the valve and a source of fluid connected to the conduit to direct the first fluid in the actuating chamber to hold the valve open, and means to apply a second fluid under pressure from the fluid in the fluid line to the actuating chamber to oppose the force exerted by the first fluid, whereby the pressure differential of the first and second fluids will govern the position of the sealing member with respect to the valve seat.

6. A pressure control valve for a fluid line comprising a valve housing, a wall having an opening therein in said housing dividing the housing into a valve chamber and an actuating chamber, bellows means consisting of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a valve stem within the housing coupled to the free end of the bellows means and extending through the wall opening into the valve chamber, a valve sealing member on the free end of the valve stem, an inlet and an outlet port in the valve chamber, a valve seat between the inlet and outlet ports in the valve chamber to receive the sealing member and control the flow through the valve ports, a quantity of a first fluid under pressure between the first and second bellows within the actuating chamber, means to direct the first fluid in the actuating chamber to hold the valve open, and means including a fluid bearing line connected at one end to the outlet port of the valve and at its other end to the actuating chamber to apply a second fluid under pressure from the fluid in the fluid line to the actuating chamber to oppose the force exerted by the first fluid, whereby the pressure differential of the first and second fluids will govern the position of the sealing member with respect to the valve seat.

7. A pressure control valve for a fluid line comprising a valve housing, a wall having an opening therein in said housing dividing the housing into a valve chamber and an actuating chamber, bellows means consisting of a first high pressure bellows and a nesting low pressure bellows secured together in end to end relationship and a second high pressure bellows and second nesting low pressure bellows secured together in end to end relationship disposed about the first bellows and spaced therefrom, said first and second bellows being secured at one end to the wall around the opening and extending into the actuating chamber, a valve stem within the housing coupled to the free end of the bellows means and extending through the wall opening into the valve chamber, a valve sealing member on the free end of the valve stem, an inlet and an outlet port in the valve chamber, a valve seat between the inlet and outlet ports in the valve chamber to receive the sealing member and control the flow through the valve ports, a quantity of a first fluid under pressure between the first and second bellows within the actuating chamber, means including a conduit in the valve housing leading from the space between the first and second bellows to the outside of the valve and a source of fluid connected to the conduit to direct the first fluid in the actuating chamber to hold the valve open, and means including a fluid bearing line connected at one end to the outlet port of the valve and at its other end to actuating chamber to apply a second fluid under pressure from the fluid in the fluid line to the actuating chamber to oppose the force exerted by the first fluid, whereby the pressure differential of the first and second fluids will govern the position of the sealing member with respect to the valve seat.

References Cited in the file of this patent

UNITED STATES PATENTS

| | | |
|---|---|---|
| 1,658,951 | Stitt | Feb. 14, 1928 |
| 2,389,412 | Carlton | Nov. 20, 1945 |
| 2,243,711 | Lamb | May 27, 1941 |

FOREIGN PATENTS

| | | |
|---|---|---|
| 763,558 | France | Feb. 12, 1934 |
| 866,883 | Germany | Feb. 12, 1953 |